(12) United States Patent
Yu

(10) Patent No.: US 11,513,209 B2
(45) Date of Patent: Nov. 29, 2022

(54) RADIO FREQUENCY RANGING USING PHASE DIFFERENCE

(71) Applicant: Analog Devices, Inc., Norwood, MA (US)

(72) Inventor: Tao Yu, Cambridge, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 177 days.

(21) Appl. No.: 17/047,016

(22) PCT Filed: Apr. 11, 2019

(86) PCT No.: PCT/US2019/026862
§ 371 (c)(1),
(2) Date: Oct. 12, 2020

(87) PCT Pub. No.: WO2019/204102
PCT Pub. Date: Oct. 24, 2019

(65) Prior Publication Data
US 2021/0190935 A1    Jun. 24, 2021

Related U.S. Application Data

(63) Continuation of application No. 15/955,049, filed on Apr. 17, 2018, now Pat. No. 10,469,184.

(51) Int. Cl.
*G01S 13/84* (2006.01)
*G01S 7/35* (2006.01)
(Continued)

(52) U.S. Cl.
CPC .............. *G01S 13/84* (2013.01); *G01S 7/352* (2013.01); *H04J 3/0682* (2013.01); *H04L 7/033* (2013.01)

(58) Field of Classification Search
CPC ........ G01S 13/84; G01S 7/352; H04J 3/0682; H04L 7/033
See application file for complete search history.

(56) References Cited

U.S. PATENT DOCUMENTS

| 3,852,751 A | 12/1974 | Wood et al. |
| 8,135,055 B2 | 3/2012 | Kohlmann |

(Continued)

FOREIGN PATENT DOCUMENTS

| JP | 3370926 | 1/2003 |
| JP | 2013-217754 | 10/2013 |

(Continued)

OTHER PUBLICATIONS

Non-Final Office Action dated Feb. 28, 2019 in U.S. Appl. No. 15/955,049.

(Continued)

*Primary Examiner* — Erin F Heard
*Assistant Examiner* — Ismaaeel A. Siddiquee
(74) *Attorney, Agent, or Firm* — Akona IP PC

(57) ABSTRACT

Embodiments of the present disclosure describe mechanisms for radio frequency (RF) ranging between pairs of radio units based on radio signals exchanged between units. An exemplary radio system may include a first radio unit, configured to transmit a first radio signal, and a second radio unit configured to receive the first radio signal, adjust a reference clock signal of the second radio unit based on the first radio signal, and transmit a second radio signal generated based on the adjusted reference clock signal. Such a radio system may further include a processing unit for determining a distance between the first and second radio units based on a phase difference between the first radio signal as transmitted by the first radio unit and the second radio signal as received at the first radio unit. Disclosed (Continued)

mechanisms may enable accurate RF ranging using low-cost, low-power radio units.

18 Claims, 8 Drawing Sheets

(51) Int. Cl.
*H04J 3/06* (2006.01)
*H04L 7/033* (2006.01)

(56) References Cited

U.S. PATENT DOCUMENTS

| | | | |
|---|---|---|---|
| 9,148,278 B1 * | 9/2015 | Ray | H03L 7/081 |
| 9,590,747 B2 | 3/2017 | Thoukydides et al. | |
| 10,469,184 B1 | 11/2019 | Yu | |
| 2002/0094786 A1 | 7/2002 | Berliner et al. | |
| 2003/0058924 A1 * | 3/2003 | Darby | H04B 1/719 |
| | | | 375/135 |
| 2010/0277360 A1 | 11/2010 | Lee | |
| 2011/0207472 A1 * | 8/2011 | Abraham | A47G 33/00 |
| | | | 455/456.1 |
| 2012/0122485 A1 * | 5/2012 | Bartlett | G01S 5/0284 |
| | | | 455/456.1 |
| 2013/0070882 A1 * | 3/2013 | Nedovic | H03L 7/235 |
| | | | 375/373 |
| 2016/0066290 A1 * | 3/2016 | Cohen | H04W 56/0015 |
| | | | 370/336 |
| 2016/0077204 A1 | 3/2016 | Lee et al. | |
| 2016/0178744 A1 * | 6/2016 | Kluge | H04W 24/00 |
| | | | 342/458 |
| 2019/0073850 A1 | 3/2019 | Burroughs et al. | |
| 2019/0319722 A1 | 10/2019 | Yu | |

FOREIGN PATENT DOCUMENTS

| KR | 10-1038617 | 6/2011 |
|---|---|---|
| WO | 2019/204102 | 10/2019 |

OTHER PUBLICATIONS

Final Office Action dated Jun. 20, 2019 in U.S. Appl. No. 15/955,049.
Notice of Allowance dated Jul. 11, 2019 in U.S. Appl. No. 15/955,049.
International Search Report and Written Opinion issued in International Patent Application Serial No. PCT/US2019/026862 dated Aug. 22, 2019, 19 pages.
Michał Śmieja, The Use of RF Communication Devices in Ranging Applications, The 9th International Conference "Environmental Engineering" May 22-23, 2014, Vilnius, Lithuania, 978-609-457-640-9, 6 pages.
Xinrong Li et al., Super-Resolution TOA Estimation with Diversity for Indoor Geolocation, IEEE Transactions on Wireless Communications, vol. 3, No. 1, Jan. 2004, 1536-1276/04 © 2004 IEEE, 11 pages.
Steven Lanzisera et al., RF Time of Flight Ranging for Wireless Sensor Network Localization, Workshop on Intelligent Solutions in Embedded Systems (WISE'06), Vienna, Jun. 2006, 12 pages.
Liang Song et al., Matrix Pencil for Positioning in Wireless Ad Hoc Sensor Network, © Springer-Verlag Berlin Heidelberg 2004, 10 pages.
Jacek Rapinski et al., ZigBee Ranging Using Phase Shift Measurements, The Journal of Navigation (2015), 68, © The Royal Institute of Navigation, 2015 doi: 10.1017/S0373463315000028, 13 pages.
Gerald Morrison et al., Super-Resolution Modeling of the Indoor Radio Propagation Channel, IEEE Transactions on Vehicular Technology, vol. 47, No. 2, May 1998, 9 pages.
G. M. Roshan Indika Godaliyadda et al., Versatile Algorithms for Accurate Indoor Geolocation, 978-1-4244-3298-1/09 © 2009 IEEE, 6 pages.
Mathias Pelka et al., Accurate Radio Distance Estimation by Phase Measurements with Multiple Frequencies, 2014 International Conference on Indoor Positioning and Indoor Navigation, Oct. 27-30, 2014, 978-1-4673-8054-6/14 © 2014 IEEE, 10 pages.
Harri Saarisaari, TLS-Esprit in a Time Delay Situation, 0-7803-3659-3/97 © 1997 IEEE, 5 pages.
Mathias Pelka et al., Indoor Localization based on Bi-Phase Measurements for Wireless Sensor Networks, 2015 IEEE Wireless Communications and Networking Conference (WCNC)—Track 3: Mobile and Wireless Networks, 978-1-4799-8406-0/15 © 2015 IEEE, 6 pages.
Tapan K. Sarkar et al., Using the Matrix Pencil Method to Estimate the Parameters of a Sum of Complex Exponentials, IEEE Antennas and Propagation Magazine, vol. 37, No. 1, Feb. 1995, 1045-9243/93 © 1995, 8 pages.
English Translation of JPH10322752 (published as JP3370926) (Abstract, Description and Claims).
English Translation of KR10138617 (Abstract, Description and Claims).
English Translation of JP2013217754 (Abstract, Description and Claims).

* cited by examiner

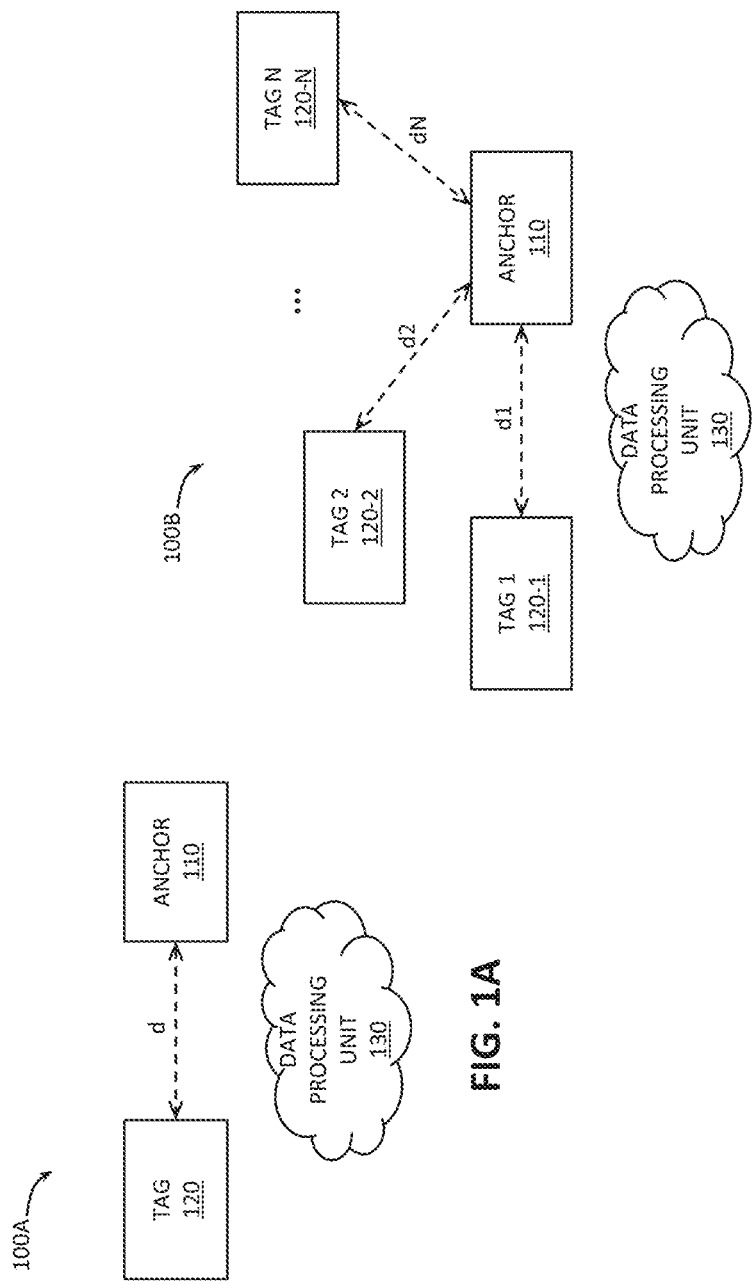

ary and advantages thereof, reference is made to the following description, taken in conjunction with the accompanying figures, wherein like reference numerals represent like parts, in which:
RADIO FREQUENCY RANGING USING PHASE DIFFERENCE

CROSS-REFERENCE TO RELATED APPLICATIONS

This application is a national stage application under 35 U.S.C. § 371 of PCT International Application Serial No. PCT/US2019/026862 filed 11 Apr. 2019 titled "RADIO FREQUENCY RANGING USING PHASE DIFFERENCE", which claims the benefit of and priority from U.S. Non-Provisional patent application Ser. No. 15/955,049 filed 17 Apr. 2018 titled "RADIO FREQUENCY RANGING USING PHASE DIFFERENCE", incorporated herein by reference in its entirety.

TECHNICAL FIELD OF THE DISCLOSURE

The present disclosure generally relates to radio systems and, more particularly, to radio frequency (RF) distance estimation by using phase difference.

BACKGROUND

Radio systems are systems that transmit and receive signals in the form of electromagnetic waves in the RF range of approximately 3 kilohertz (kHz) to 300 Gigahertz (GHz). Radio systems are commonly used for wireless communications. Two radio units in the same radio system can exchange information wirelessly using protocols such as Bluetooth™, wireless local area network (WLAN) or IEEE 802.15.4 compliant protocols. Some examples of such radio systems include wireless sensor network, Bluetooth enabled handsets, and smart home systems.

In some settings, it may be desirable to be able to determine distance between two radio units automatically (i.e. without or with minimal user intervention), a process referred to as "RF ranging." For example, pair-wise range measurements between a mobile device and multiple access points with RF ranging can identify the location of the mobile device.

One approach to determining distance between two radio units is to employ phase-based measurements, where the differences in phase between signals are analyzed to estimate distance. In such measurements, reference clock signals of the different radio units need to be synchronized to be within tight timing tolerances as specified by a particular application. Such synchronicity may be difficult to achieve, especially at high clock speeds.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A provides a block diagram illustrating an example radio system according to some embodiments of the present disclosure;

FIG. 1B provides a block diagram illustrating an example radio system according to other embodiments of the present disclosure;

DESCRIPTION OF EXAMPLE EMBODIMENTS OF THE DISCLOSURE

Overview

Figure 2A:
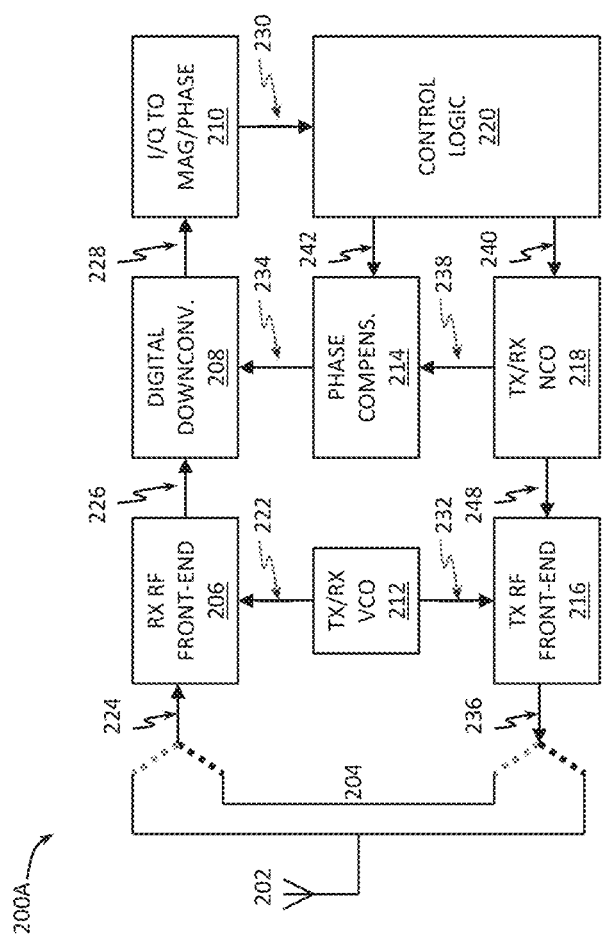
FIG. 2A provides a block diagram illustrating an example radio unit according to some embodiments of the present disclosure.

The systems, methods and devices of this disclosure each have several innovative aspects, no single one of which is solely responsible for all of the desirable attributes disclosed herein. Details of one or more implementations of the subject matter described in the present disclosure are set forth in the description below and the accompanying drawings.

Embodiments of the present disclosure provide mechanisms for RF ranging, namely for determining distances between pairs of radio units, based on radio signals exchanged between them. In particular, disclosed mechanisms use phase difference measurements to determine distances between pairs of different radio units. In one aspect, an exemplary radio system may include a first radio unit, configured to transmit a first radio signal (e.g. first RF signal), and a second radio unit, configured to receive the first radio signal, adjust a reference clock signal of the second radio unit based on the first radio signal, and transmit a second radio signal (e.g. second RF signal) generated based on the adjusted reference clock signal. Such a radio system may further include a data processing unit configured to determine a distance between the first and second radio units based on a phase difference between the first radio signal as transmitted by the first radio unit and the second radio signal, transmitted by the second radio unit, but as received at the first radio unit. Automatically adjusting the reference clock signal of the second radio unit based on the first radio signal may eliminate or at least reduce the burden of requiring synchronicity between reference clocks of the first and second radio units. Disclosed mechanisms may enable accurate RF ranging using low-cost, low-power radio units, and may be particularly suitable to enable existing radio systems, e.g. those used for wireless data communication, to provide distance measurements.

Because the first radio unit is the unit that sends a radio signal used by another, e.g. the second, radio unit to adapt its' reference clock signal to said radio signal, in the following descriptions, the first radio unit may be referred to as an "anchor" (or as a "master"), while the second radio unit may be referred to as a "tag" (or as a "slave"). In general, the term "radio unit" refers to a unit capable of transmitting (TX) and receiving (RX) radio signals, e.g. using any of the suitable allocated frequency bands, and may alternatively be referred to as a "TX/RX unit." In the following, the terms "radio signal" and "RF signal" may be used interchangeably, but, in general, descriptions provided herein may be applicable to signals in the radio spectrum (i.e. the spectrum of electromagnetic radiation other than optical spectrum) other than RF waves, e.g. to microwave signals and/or to terahertz radiations.

As will be appreciated by one skilled in the art, aspects of the present disclosure, in particular aspects of RF ranging using phase difference measurements as described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing radio units and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. For convenience, if a collection of drawings designated with different letters are present, e.g., FIGS. 1A-1B, such a collection may be referred to herein without the letters, e.g., as "FIG. 1."

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value based on the context of a particular value as described herein or as known in the art.

Other features and advantages of the disclosure will be apparent from the following description and the claims.

Example Radio System

FIG. 1A provides a block diagram illustrating an example radio system 100A according to some embodiments of the present disclosure.

As shown in FIG. 1A, the system 100A may include at least a first radio unit 110, described to herein as an "anchor" 110, and a first radio unit 120, described herein as a "tag" 120. As described in greater detail below, the anchor 110 may be configured to transmit a first radio signal (e.g. first RF signal), while the tag 120 may be configured to receive the first radio signal, adjust its' reference clock signal based on the received first radio signal, and transmit a second radio signal (e.g. second RF signal) generated based on the adjusted reference clock signal. In some embodiments, each of the anchor 110 and the tag 120 may be configured to function both as the anchor and the tag as described herein.

As also shown in FIG. 1A, the system 100A may further include a data processing unit 130 configured to perform distance determination as described herein. As described in greater detail below, the data processing unit 130 may be configured to determine a distance between the anchor 110 and the tag 120 based on a phase difference between the first radio signal as transmitted by the anchor 110 and the second radio signal, transmitted by the tag 120, as received at the anchor 110.

In some embodiments, the data processing unit 130 may be included within the anchor 110. In other embodiments, the data processing unit 130 may be included external to the anchor 110 and the tag 120, e.g. the data processing unit 130 may be a cloud-based unit, communicatively coupled to one or both of the anchor 110 and the tag 120 and configured to perform distance determination as described herein based on data received from the anchor 110 and, optionally, data received from the tag 120.

In general terms, each of the anchor 110 and the tag 120 can be a device capable of transmitting and receiving radio signals. In some embodiments, each of the anchor 110 and the tag 120 can be a device used to initiate a communication, such as a wireless sensor, a handset, a smart home system device, a computer, a personal digital assistant (PDA), a laptop or electronic notebook, a cellular telephone, an i-Phone™, i-Pad™, a Google Droid™ phone, an Internet Protocol (IP) phone, or any other device, component, element, or object capable of initiating voice, audio, video, media, or data exchanges within the radio system 100A. Further exemplary details of how the anchor 110 and the tag 120 may be implemented are shown in FIG. 2A.

In some embodiments, one or more of the anchor 110, the tag 120, and the data processing unit 130 may be implemented as a radio access point device that can connect to a wired network using e.g. Bluetooth™, WLAN (e.g. Wi-Fi), IEEE 802.15.4 protocol, 3rd Generation Partnership Project (3GPP) network (e.g. 3G, 4G, Long Term Evolution (LTE), 5G) protocols, non-3GPP network (e.g. WiMAX) protocols, or any other appropriate standard. In some embodiments, one or more of the anchor 110, the tag 120, and the data processing unit 130 may be include software (or reciprocating software) that can coordinate in order to achieve their operations and/or features, as outlined herein. In some embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

While the radio system 100A shown in FIG. 1A illustrates only one of each of the anchor 110, the tag 120, and the data processing unit 130, in general, the radio system 100A may include any number of one or more of these elements. In particular, providing more than two radio units such as the anchor 110 and the tag 120 described herein would enable distance determination between various pairs of these units. For example, FIG. 1B illustrates a radio system 100B which includes a single anchor 110 communicating with a plurality of tags 120, labeled in FIG. 100B as tags 120-1, 120-2, ..., and 120-N (i.e., N tags 120 may be used, where N is an integer greater than 1). The radio system 100B is substantially similar to the radio system 100A, and, therefore, descriptions provided for the radio system 100A are applicable to the radio system 100B, except that the radio system 100B may be configured to carry out RF distance estimation using phase difference as described herein between the anchor 110 and multiple tags 120, to determine distances d1, d2, ..., dN to any of these tags. In some embodiments where a single anchor 110 may need to determine distance to N tags 120, the anchor 110 may perform N point-to-point 2-way phase-based measurements as described herein, where "point-to-point" refers to the fact that the anchor 110 may be configured to transmit the first radio signal as described herein to each of the N tags 120 individually, e.g., as a unicast transmission. The tags 120 may then perform adjustment of their reference clock signals based on the first radio signal received, as described herein. In other embodiments where a single anchor 110 may need to determine distance to N tags 120, the anchor 110 may perform phase-based measurements by transmitting the first radio signal directed to more than 1 tag 120, e.g., using multicast or broadcast transmission. The tags 120 may then individually perform adjustment of their reference clock signals based on the first radio signal received, as described herein.

Example Radio Units

FIG. 2A provides a block diagram illustrating an example radio unit 200A according to some embodiments of the present disclosure. In some embodiments, each of the anchor 110 and the tag 120 of the radio systems 100A or 100B may be implemented as the radio unit 200A.

As shown in FIG. 2A, the radio unit 200A may include an antenna 202 for transmitting and receiving radio signals, a switch 204 for connecting and disconnecting the antenna 202 to a receive path or a transmit path of the radio unit 200A. In general, a receive path of the radio unit 200A may be considered to include a receive (RX) RF front-end 206, a digital downconverter 208, and an I/Q to magnitude/phase converter 210, while a transmit path of the radio unit 200A may be considered to include a transmit (TX) RF front-end 216. As also shown in FIG. 2A, the radio unit 200A may further include a transmit/receive (TX/RX) voltage controlled oscillator (VCO) 212, a phase compensation unit 214, a TX/RX numerically controlled oscillator (NCO) 218, and a control logic 220.

While various elements are shown in FIG. 2A as separate units, in various embodiments, two or more of any of those units may be combined. Similarly, in various embodiments, functionality of any of those units may be implemented in further divided units, e.g. the TX/RX VCO 212 may include a separate TX VCO and an RX VCO, or the TX/RX NCO 218 may include a separate TX NCO and an RX NCO. Furthermore, other functional units are not specifically shown in FIG. 2A in order to not clutter the drawing, such as e.g. analog-to-digital converters (ADCs), digital-to-analog converters (DACs), various filters, etc.

Turning to the functionality of the elements shown in FIG. 2A, the RX RF front-end 206 may be configured to receive electrical signals 224 indicative of, or representing, wireless radio signals received by the antenna 202.

The VCO 212 may be configured to generate a local oscillator signal 222 for the receive path and a local oscillator signal 232 for the transmit path. In operation of the radio unit 200A, both the anchor 110 and the tag 120 are configured to step over a plurality of RF frequencies by setting their TX/RX VCOs to generate local oscillator signals 222, 232 accordingly. Distance determination according to a two-way ranging protocol as described herein and shown in FIG. 3 may then be performed at each of the RF frequencies.

The RX RF front-end 206 may be configured to mix the received radio signals 224 with the local oscillator signal 222 (for the receive path) generated by the TX/TX VCO 212 to generate a downconverted complex intermediate frequency (IF) signals 226.

The digital downconverter 208 may be configured to perform multiplication operation of the complex IF signal 226 and a complex phase-compensated NCO signal 234 to generate a complex output baseband signal 228. In particular, in some embodiments, the digital downconverter 208 may be configured to multiply the complex IF signal 226 with a complex conjugate of the complex phase-compensated NCO signal 234. For example, in one embodiment, the digital downconversion operation performed by the digital downconverter 208 may produce the following output 228:

$$\text{Output\_I} = IF\_I \times NCO\_I + IF\_Q \times NCO\_Q, \text{ and}$$

$$\text{Output\_Q} = IF\_Q \times NCO\_I - IF\_I \times NCO\_Q,$$

where Output_I is the in-phase component of the complex output baseband signal 228, Output_Q is the quadrature component of the complex output baseband signal 228, IF_I is the in-phase component of the complex IF signal 226, IF_Q is the quadrature component of the complex IF signal 226, NCO_I is the in-phase components of the complex phase-compensated NCO signal 234, and NCO_Q is the quadrature component of the complex phase-compensated NCO signal 234. As is known in the art, quadrature is a term to describe a complex signal instead of a real signal, with the in-phase and quadrature components corresponding, respectively, to the real and imaginary parts of a complex signal.

The I/Q to magnitude/phase converter 210 may be configured to convert the received Cartesian (I/Q) representation of the complex output baseband signal ($s_{bb}$) 228 ($s_{bb}$=I+j*Q) to corresponding magnitude (A) and phase ($\varphi$) output ($S_{bb}$) 230 ($S_{bb}$=A exp(j$\varphi$)), indicative of magnitude and phase of the baseband signal 228. The magnitude/phase output 230 may then be provided to the control logic 220 to enable the control logic to e.g. measure the frequency of the baseband signal 228.

The TX/RX NCO 218 provides the reference clock signal(s) for the radio unit 200A. In particular, the TX/RX NCO 218 may be configured to generate a TX NCO IF signal 248 for the transmit path (during the frequency offset correction step), which signal may be mixed, by the TX RF front-end 216, with the TRX VCO signal 232 from the TX/RX VCO 212 to generate the radio signal 236 to be transmitted by the antenna 202. Thus, the TX RF front-end 216 is configured to generate an upconverted radio signal 236 from the complex IF signal 248 and the TX VCO signal 232. The TX/RX NCO 218 may also be configured to generate a RX NCO IF signal 238 for the receive path, which may be provided to the phase compensation unit 214 (or directly to the digital downconverter 208, if the optional phase compensation unit 214 is not implemented).

The phase compensation unit 214 may be configured to compensate for phase shifts in signals processed by the radio unit 200A due to the internal components and paths (e.g. wires) of the radio unit 200A, which compensation may be a part of an optional loopback calibration procedure described herein. To that end, the phase compensation unit 214 may use phase compensation words 242 provided by the control logic 220. If such a calibration procedure is not implemented, the phase compensation unit 214 may be omitted from the radio unit 200A.

Figure 7:
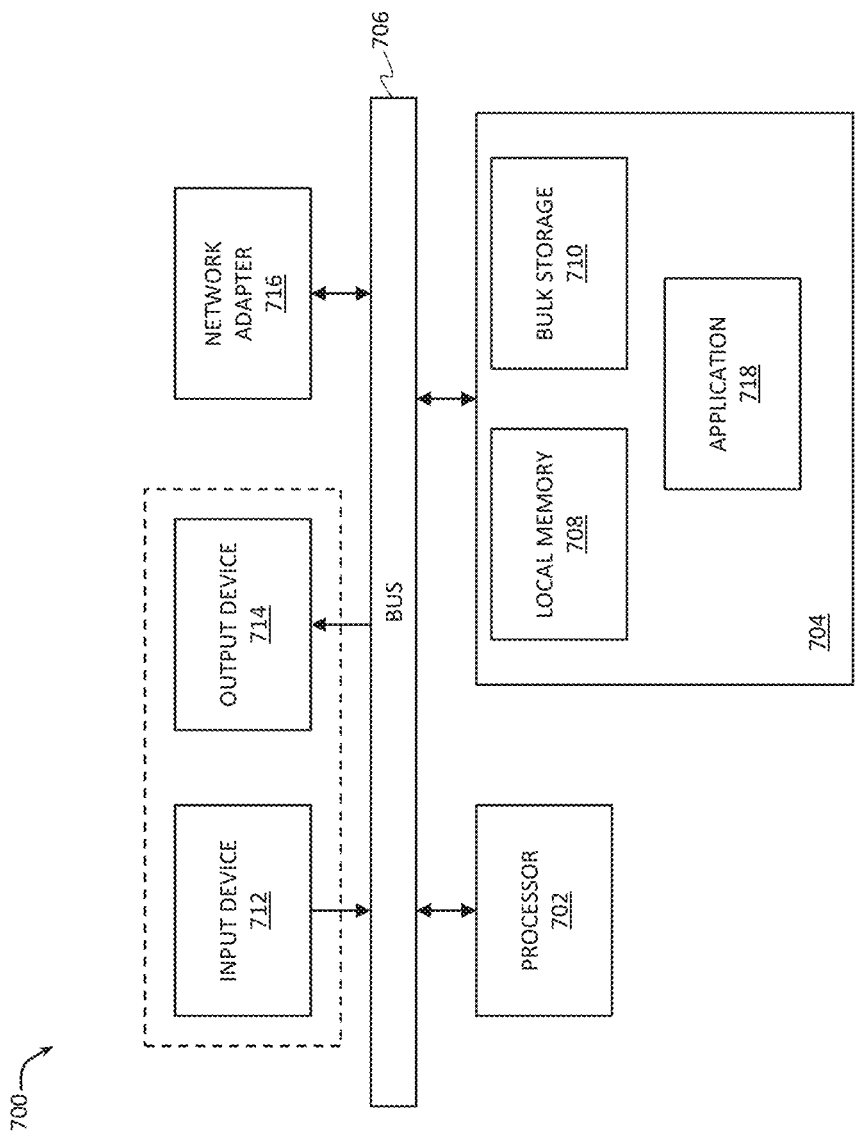
FIG. 7 provides a block diagram illustrating an example data processing system that may be configured to implement at least portions of the method shown in FIG. 3, according to some embodiments of the present disclosure.

The control logic 220 may be configured to quantify and control adjustment of the frequency and the phase of the reference clock signal of the tag 120, as described in greater detail below. In particular, the control logic 220 may be configured to adjust frequency and phase of the reference clock signal generated by the TX/RX NCO 218 by computing appropriate adjustments and by indicating those adjustments by sending corresponding frequency and phase offset words 240 to TX/RX NCO 218. In the embodiments where the phase compensation unit 214 is used, the control logic 220 may further be configured to provide phase compensation words 242 to the phase compensation unit 214 in order to compensate for any internal phase shifts within each radio unit. In various embodiments, at least some functionality of the control logic 220 and the data processing unit 130 may be overlapping, or the functionality described with reference to one may be implemented by the other, and vice versa. Exemplary data processing system which may be used to implement each of the control logic 220 and the data processing unit 130 is shown in FIG. 7.

Figure 3:
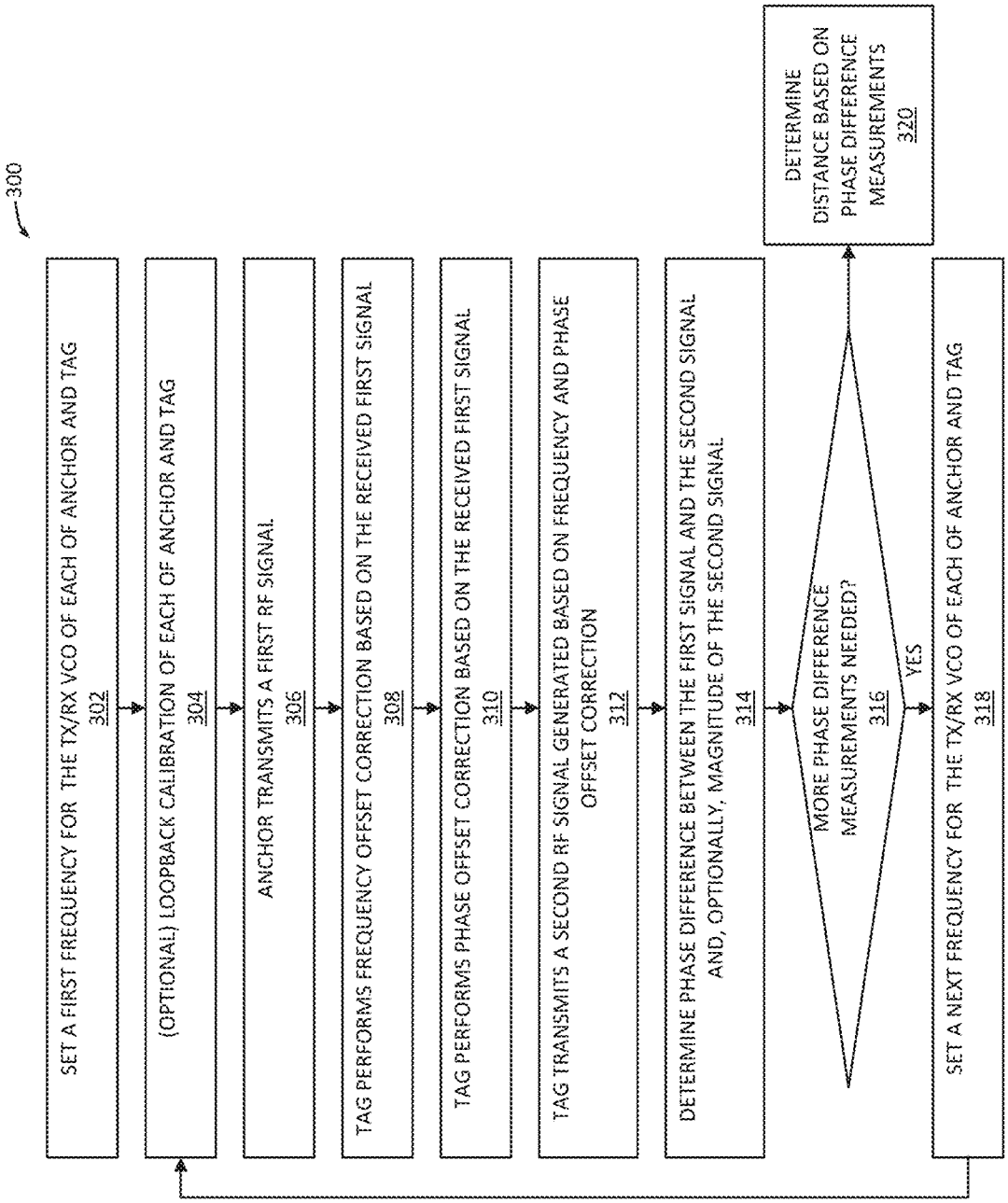
FIG. 3 presents a flowchart of an example method of operating a radio system to measure a distance between a first and a second radio units based on phase difference, according to some embodiments of the present disclosure.

Further details of the functionality of the radio unit 200A will become apparent from the following descriptions of the example method 300 of operating a radio system as shown in FIG. 3.

Figure 2B:
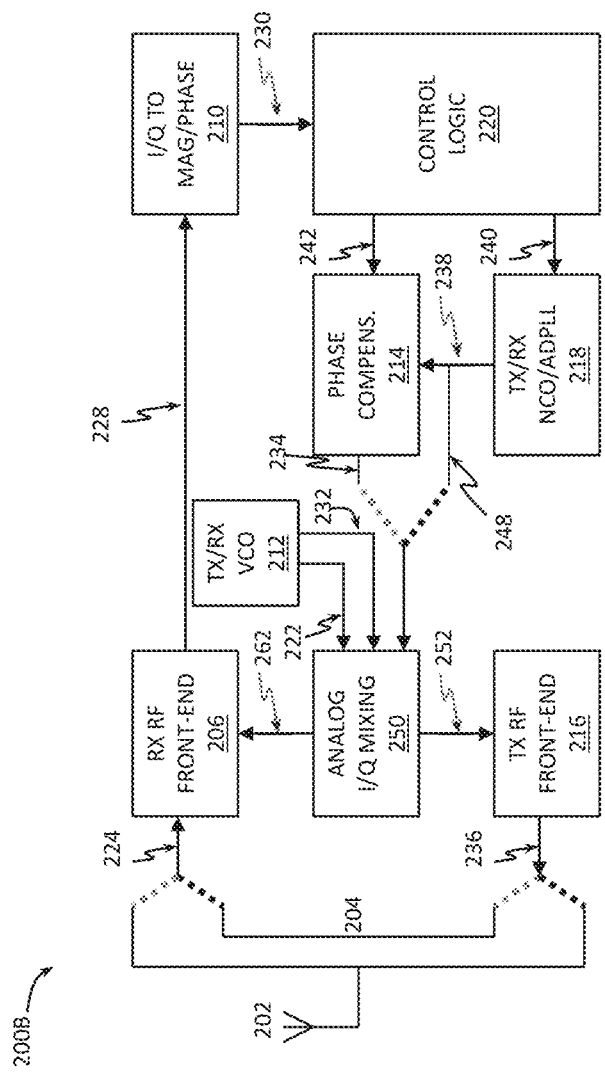
FIG. 2B provides a block diagram illustrating an example radio unit according to other embodiments of the present disclosure.

FIG. 2B provides a block diagram illustrating an example radio unit 200B according to some embodiments of the present disclosure. In some embodiments, each of the anchor 110 and the tag 120 of the radio systems 100A or 100B may be implemented as the radio unit 200B. The radio unit 200B is similar to the radio unit 200A and, therefore, unless specified otherwise, descriptions provided with respect to the radio unit 200A are applicable to the radio unit 200B and, in the interests of brevity, are not repeated here. Instead, the differences are described.

As shown in FIG. 2B, instead of the TX/RX NCO 218 providing the TX NCO IF signal 248 for the transmit path (during the frequency offset correction step) to the TX RF front-end 216 for mixing as was illustrated in FIG. 2A, in the embodiment of FIG. 2B, the TX/RX NCO 218 is configured to provide the TX NCO IF signal 248 to an analog quadrature mixing component 250. The analog quadrature mixing unit 250 is configured to receive the TX NCO IF signal 248 and mix it with the TRX VCO signal 232 from the TX/RX VCO 212 to generate the radio signal 252 which is provided to the TX RF FRONT-END unit 216 to generate the radio signal 236 to be transmitted by the antenna 202. For example, the TX RF FRONT-END unit 216 may be configured to provide the necessary power amplification to the radio signal 252 to broadcast via the antenna 202. Thus, the analog quadrature mixing unit 250 is configured to generate an upconverted radio signal 252 from the complex IF signal 248 and the TX VCO signal 232.

As also shown in FIG. 2B, the TX/RX NCO 218 is configured to generate the RX NCO IF signal 238 for the receive path, which may be provided to the phase compensation unit 214 (or directly to the analog quadrature mixing unit 250, if the optional phase compensation unit 214 is not implemented). The phase compensation unit 214 may be configured to compensate for phase shifts in signals processed by the radio unit 200B due to the internal components and paths (e.g. wires) of the radio unit 200B, which compensation may be a part of an optional loopback calibration procedure described herein. To that end, the phase compensation unit 214 may use phase compensation words 242 provided by the control logic 220. If such a calibration procedure is not implemented, the phase compensation unit 214 may be omitted from the radio unit 200B. The output from the phase compensation unit 214 (e.g., the complex phase-compensated NCO signal 234) may then be provided to the analog quadrature mixing unit 250, configured to perform frequency mixing using the complex phase-compensated NCO signal 234 and the RX VCO signal 222 to generate a complex RX LO signal 262. The RX RF front-end 206 of the tag 120 may generate a complex baseband signal 228 based on the received signal 224 and the complex RX LO signal 262.

To summarize, the variation shown in FIG. 2B may include taking the signal generated by the TX/RX NCO 218 and mixing it directly with the corresponding signal generated by the TX/RX VCO 212 (where "corresponding" refers to performing mixing either using TX path signals generated by each of 218 and 212, or using RX path signals generated by each of 218 and 212) to generate the "reference clock" at RF. In the embodiment shown in FIG. 2B, the control logic 220 may be configured to adjust the frequency and phase of the signal generated by the TX/RX NCO 218 and the phase compensation unit 214 may be configured to compensate for the phase difference in TX and RX mode in substantially the same manner as described above with reference to FIG. 2A.

FIG. 2B also illustrates that, in some embodiments, the TX/RX NCO 218 may be replaced with an all-digital phase-locked loop (ADPLL), which has analogous functionality to that of the NCO 218, but is configured to output an analog signal (whereas the TX/RX NCO 218 may generate a digital signal which may then be converted to an analog signal using a DAC included in the TX/RX NCO 218). The same modification is applicable to the radio system 200A shown in FIG. 2A (i.e., the TX/RX NCO 218 shown in FIG. 2A may also be replaced with the ADPLL).

Operating a Radio System to Measure a Distance Between Anchor and Tag

FIG. 3 presents a flowchart of an example method 300 of operating a radio system to measure a distance between a first and a second radio units based on phase difference, according to some embodiments of the present disclosure. While the method 300 is described with reference to the radio system 100A described with reference to FIG. 1A where it is assumed that each of the anchor 110 and the tag is implemented as the radio unit 200A described with reference to FIG. 2A, in general, the method 300 may be performed by any radio system with anchor and tag being any suitable radio units, e.g. where at least one of anchor and tag may have at least some, but not necessarily all, of the components of the radio unit 200A.

As described above, during distance measurements, both the anchor 110 and the tag 120 may be configured to step over a plurality of RF frequencies by setting their respective TX/RX VCOs 212. The anchor 110 and the 120 are then configured to perform a two-way ranging protocol, described herein with reference to steps 306-314 of the method 300, at each of the RF frequencies.

Thus, as shown in FIG. 3, the method 300 may begin with step 302 where each of the anchor 110 and the tag 120 sets their TX/RX VCO 212 to a first frequency of the plurality of RF frequencies through which their VCOs 212 are to step as a part of measuring a distance between the anchor 110 and the tag 120. In some embodiments, the method 300 may begin when both of the anchor 110 and the tag 120 receive some kind of a trigger signal indicating that they are to start distance measurements. In some other embodiments, the anchor 110 and the tag 120 can be configured to negotiate on the measurement start time through data communications, and the method 300 may begin at a negotiated future time. In other embodiments, the method 300 may begin when only the anchor 110 is triggered to start the measurements, and the tag 120 only starts participating in the measurements when it receives the first radio signal from the anchor 110. In such embodiments, step 302 may be implicitly accomplished by the tag 120 having its TX/RX VCO 212 having set to a certain predefined first frequency.

Optionally, the method 300 may include step 304 during which at least one, but preferably each, of the anchor 110 and the tag 120 perform a loopback calibration procedure to correct for any phase shifts which may be introduced on their receive and transmit paths due to the architecture of these devices. Some loopback calibration procedures are known in the art and any of these known methods may be performed in step 304. Alternatively, at least one, but preferably each, of the anchor 110 and the tag 120 may be configured to perform a loopback calibration procedure as proposed herein, described in greater detail below.

After that, the anchor 110 and the tag 120 may perform a two-way ranging protocol as described in steps 306-314 for the first frequency of their TX/RX VCOs 212. In general, the two-way ranging protocol of steps 306-314 may be seen as including three parts: 1) frequency offset correction to adjust the frequency of the reference clock signal of the tag 120, 2) phase offset correction to adjust the phase of the reference clock signal of the tag 120, and 3) two-way phase difference measurement based on a radio signal transmitted by the anchor 110 and a radio signal received at the anchor 110 from the tag 120, the latter signal generated using the adjusted reference clock signal of the tag 120. During the entirety of the two-way ranging protocol, TX/RX NCOs 218 of both the anchor 110 and the tag 120 may be configured to maintain their oscillation based on the frequency and phase offset control words 240 provided by the control logic 220, and TX/RX VCOs 212 of both the anchor and tag may be configured to maintain their oscillation based on the setting of their RX RF front-end 206 and/or TX RF front-end 216.

Figure 4:
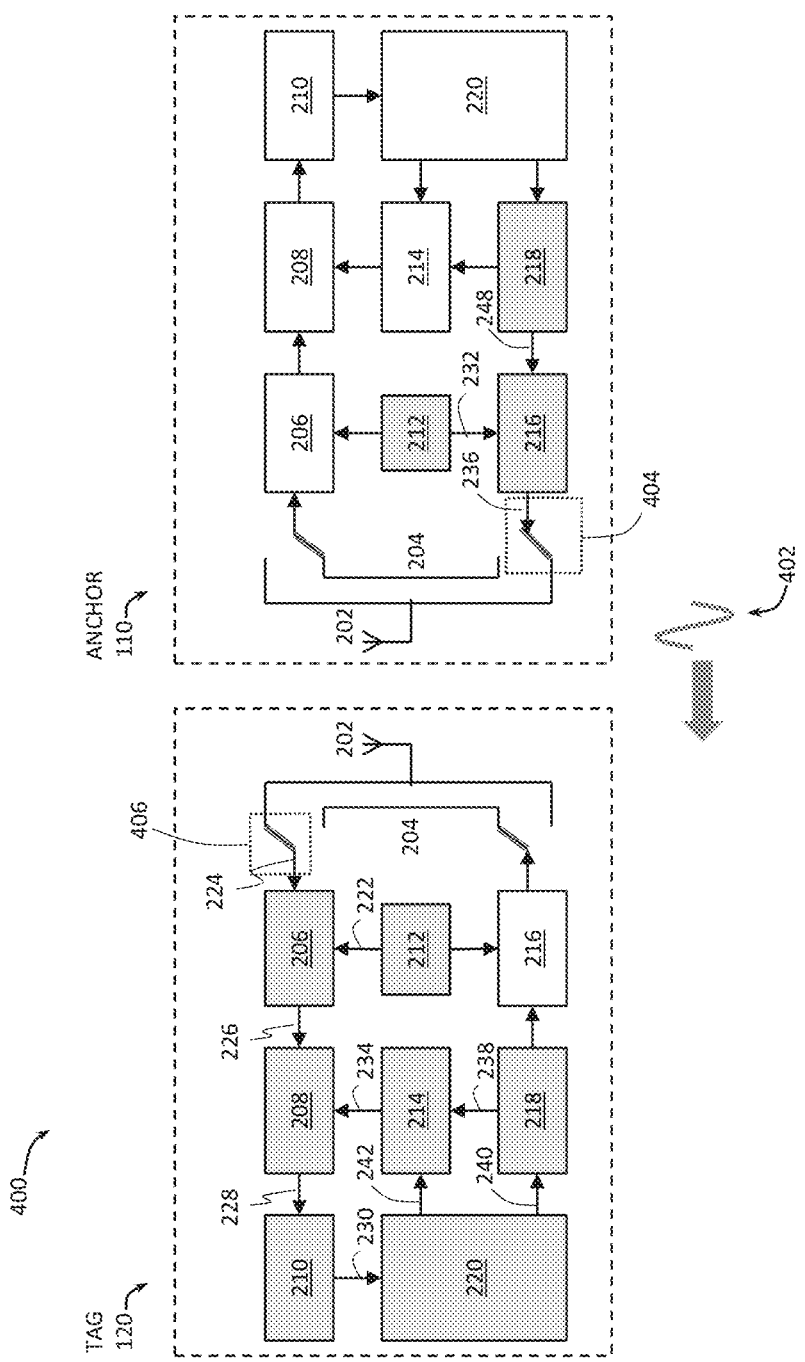
FIG. 4 provides a block diagram illustrating an arrangement in which the first radio unit transmits a signal to the second radio unit for the purpose of distance measurement using the method shown in FIG. 3, according to some embodiments of the present disclosure.

The frequency offset correction part of the two-way ranging protocol may be viewed as beginning with the step 306 in which the anchor 306 transmits a first wireless radio signal, e.g. a first RF signal. FIG. 4 provides a block diagram illustrating an arrangement 400 in which a first radio unit, e.g. the anchor 110, transmits a wireless radio signal (schematically illustrated in FIG. 4 as a radio signal 402) to a second radio unit, e.g. the tag 120, for the purpose of distance measurement using the method shown in FIG. 3, according to some embodiments of the present disclosure. As can be seen in FIG. 4, the arrangement 400 assumes that each of the anchor 110 and the tag 120 is implemented as the radio unit 200A.

In FIG. 4, components which are enabled as the anchor 110 transmits the first radio signal to the tag 120 indicated in FIG. 4 are colored with a grey highlight. Thus, FIG. 4 illustrates that, during the frequency offset correction step, the anchor 110 may enable the TX/RX VCO 212 (more specifically, the TX VCO 212), the TX/RX NCO 218 (more specifically, the TX NCO 218), the TX RF front-end 216. As also illustrated in FIG. 4, at that time, the switch 204 of the anchor 110 is in a position configured to enable a signal path so that the signal 236 may be provided from the TX RF front-end 216 to the antenna 202, over a suitable wire interconnect (the relevant switch position of the anchor 110 indicated in FIG. 4 with a dotted box 404). In this manner, the anchor 110 is configured to transmit, e.g. by broadcast, the first wireless radio signal 402 (which may later be received by the tag 120) as a part of step 306 shown in FIG. 3. In the illustration of FIG. 4, the signal 236 is a radio signal provided over the wired connection, which signal is then transmitted wirelessly as the first radio signal 402. In particular, in step 306, the TX NCO 218 of the anchor 110 may be configured to generate an IF signal 248, the TX RF front-end 216 of the anchor 110 may be configured to mix the IF signal 248 with the TX VCO signal 232 to generate the RF signal 236, and the antenna 202 may then broadcast the RF signal 236 as the wireless first radio signal 402.

Turning to the tag 120, as shown in FIG. 4, during the frequency offset correction part and in the time period when the anchor 110 transmits the first radio signal 402, the switch 204 of the tag 120 may be in a position configured to enable a signal path so that when the antenna 202 of the tag 120 receives the first radio signal 402 transmitted by the anchor 110, it may provide a signal 224 representing the received first radio signal 402 to the RX RF front-end 206 of the tag 120 (the relevant switch position of the tag 120 indicated in FIG. 4 with a dotted box 406). In this manner, the tag 120 is configured to receive the first wireless radio signal 402 transmitted by the anchor 110 in step 306. The signal 224 is a radio signal provided over the wired connection, which signal is representative of the wireless first radio signal 402 received at the antenna 202 of the tag 120. As also shown in FIG. 4, during the frequency offset correction part and in the time period when the anchor 110 transmits the first radio signal 402, the following components of the tag 120 may be enabled: the TX/RX VCO 212 (more specifically, the RX VCO 212), the RX RF front-end 206, the digital downconverter 208, the I/Q to Mag/Phase converter 210, the TX/RX NCO 218 (more specifically, the RX NCO 218), the control logic 220, and, optionally, the phase compensation unit 214.

The frequency offset correction part of the two-way ranging protocol may be viewed as further including step 308 in which the tag 120 performs frequency offset correction based on the received first radio signal 402. In particular, in step 308, the control logic 220 of the tag 120 may compute how the frequency of the reference clock signal produced by the TX/RX NCO 218 of the tag 120 needs to be adjusted to match the frequency of the received first radio signal 402 and to instruct the TX/RX NCO 218 to perform the necessary adjustment. To that end, during the frequency offset correction step, the antenna 202 of the tag 120 may receive the first wireless radio signal 402, thus generating the RF signal 224, then the RX RF front-end 206 of the tag 120 may downconvert the received signal 224 by mixing the received signal 224 with the RX VCO signal 222 to generate a complex IF signal 226. The complex IF signal 226 may be provided to the digital downconverter 208 of the tag 120 which may further downconvert the complex IF signal 226 using the complex phase-compensated NCO signal 234, thus generating a baseband signal 228. The I/Q to mag/phase conversion unit 210 of the tag 120 may then convert the I/Q complex baseband signal 228 to a corresponding magnitude and phase 230 (which conversion may e.g. be carried out as described above), provided to the control logic 220. The control logic 220 of the tag 120 may then measure the frequency of the baseband signal 228, which is indicative of the frequency of the first radio signal 402 transmitted by the anchor 110, using the phase output 230 from I/Q to Mag/Phase conversion unit 210 of the tag 120. The control logic 220 of the tag 120 may then correct/adjust the frequency difference between the TX NCO signal 248 of the tag 120 and the IF signal 226 by sending a corrected frequency word 240 to the TX/RX NCO 218 of the tag 120 (i.e. the control logic 220 of the tag 120 may adjust the frequency of the TX NCO signal 248 of the tag 120). In some embodiments, the control logic 220 of the tag 120 may adjust the frequency of the reference signal 248 produced by the TX NCO 218 to be substantially equal to that of the IF signal 226. In some embodiments, both TX NCO and RX NCO of the TX/RX NCO 218 of the tag 120 may receive the frequency control word 240 from the control logic 220 and change their oscillation frequency synchronously, thus adjusting the frequency of the reference clock signal of the tag 120 both for RX and TX NCO as a part of step 308.

Once the frequency of the reference clock signal of the tag 120 has been adjusted, the method 300 may then proceed with step 310 where the tag 120 performs phase offset correction based on the received first radio signal 402 (i.e. step 310 represents the phase correction part of the two-way ranging protocol described herein). During the phase correction part, the anchor 110 may remain in the same state as during the frequency correction part (e.g. as shown in FIG. 4). During the phase correction step 310, the tag 120 may be configured to maintain its signal path as during the frequency correction part (e.g. as shown in FIG. 4), while the control logic 220 of the tag 120 may compute the phase difference between the complex frequency-adjusted RX NCO signal 238, possibly also phase-compensated for any internal phase shifts during the optional calibration step 304 resulting in the phase-compensated and frequency-adjusted RX NCO signal 234, and the IF signal 226 using the phase output 230 from the I/Q to Mag/Phase conversion unit 210 of the tag 120. In other words, if the phase compensation unit 214 is not used, the control logic would use the phase output 230 from the I/Q to Mag/Phase conversion unit 210 of the tag 120 to compute a phase difference between the IF signal 226 and the complex frequency-adjusted RX NCO signal 238; otherwise, the control logic 220 would compute the phase difference between the IF signal 226 and the phase-compensated and frequency-adjusted RX NCO signal 234. The control logic 220 may then correct the measured phase difference, namely adjust the phase of the reference clock signal generated by the TX/RX NCO 218 to match (i.e. be substantially equal to or be at a known predefined phase difference to) that of the IF signal 226, by sending a phase offset word 240 to TX/RX NCO 218 of the tag 120. In some embodiments, both TX/RX NCO 218 receive the phase offset word 240 and change their instantaneous phase synchronously. In other words, in some embodiments, both TX NCO and RX NCO of the TX/RX NCO 218 of the tag 120 may receive the phase offset word 240 from the control logic 220 and change their oscillation frequency synchronously, thus adjusting the phase of the reference clock signal of the tag 120 both for RX and TX NCO as a part of step 310. The control logic 220 may then further determine the magnitude of the first radio signal 402, as received at the tag 120, from the magnitude value of the baseband signal 228 provided as the output 230 from the I/Q to Mag/Phase conversion unit 210. The magnitude of the baseband signal 228 may be substantially proportional to the magnitude of the first radio signal 402 (i.e. of the propagation channel) at the carrier frequency of each frequency step of the VCOs 212.

Figure 5:
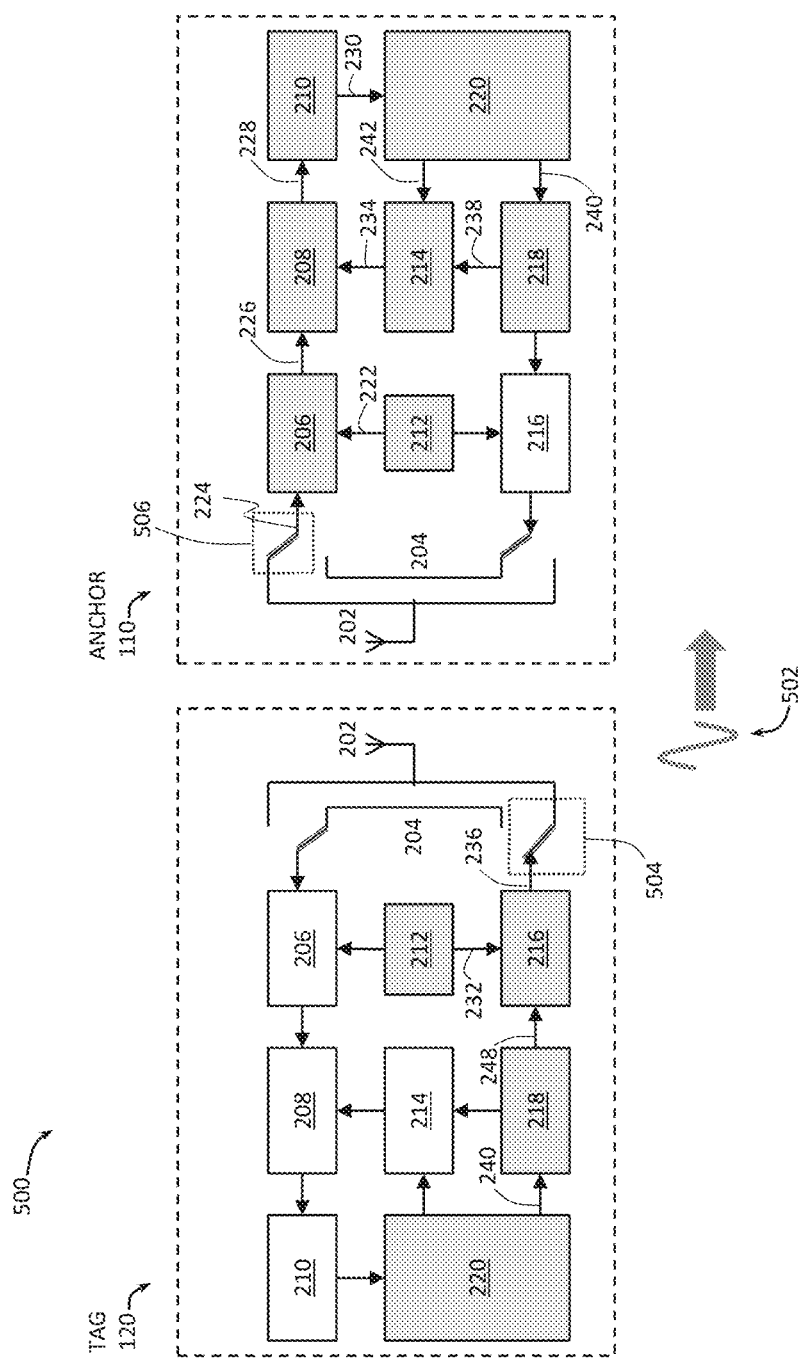
FIG. 5 provides a block diagram illustrating an arrangement in which the second radio unit transmits a pseudo-reflected signal to the first radio unit for the purpose of distance measurement using the method shown in FIG. 3, according to some embodiments of the present disclosure.

The method 300 may then proceed with step 312 in which the tag 120 transmits a second radio signal, e.g. a second RF signal. FIG. 5 provides a block diagram illustrating an arrangement 500 in which the second radio unit, e.g. the tag 120, transmits a second wireless radio signal (schematically indicated in FIG. 5 as a signal 502) to the first radio unit, e.g. the anchor 110, for the purpose of distance measurement using the method shown in FIG. 3, according to some embodiments of the present disclosure. Similar to FIG. 4, as can be seen in FIG. 5, the arrangement 500 assumes that each of the anchor 110 and the tag 120 is implemented as the radio unit 200A, where components which are enabled as the tag 120 transmits the second radio signal 502, to be received by the anchor 110, indicated in FIG. 5 by being colored with a grey highlight.

As shown in FIG. 5, in order to transmit the second radio signal 502 in step 312, the tag 120 may enable its' TX/RX VCO 212 (more specifically, the TX VCO 212), the TX/RX NCO 218 (more specifically, the TX NCO 218), control logic 220, and TX RF front-end 216. As also illustrated in FIG. 5, at that time, the switch 204 of the tag 120 is in a position configured to enable a signal path so that the signal 236 may be provided from the TX RF front-end 216 to the antenna 202, over a suitable wire interconnect (the relevant switch position of the tag 120 indicated in FIG. 5 with a dotted box 504). In this manner, the tag 120 is configured to transmit, e.g. by broadcast, the second wireless radio signal 502 (which may later be received by the anchor 110) as a part of step 312 shown in FIG. 3. In the illustration of FIG. 5, the signal 236 is a radio signal provided over the wired connection, which signal is then transmitted wirelessly as the second radio signal 502). In particular, in step 312, the TX NCO 218 of the tag 120 may be configured to generate an IF signal 248, which signal is now frequency- and phase-adjusted as a result of performing steps 308 and 310, respectively; then the TX RF front-end 216 of the tag 120 may be configured to mix the received IF signal 248 with the TX VCO signal 232 to generate the RF signal 236, and the antenna 202 of the tag 120 may then broadcast the RF signal 236 as the wireless second radio signal 502.

Turning to the anchor 110, in order to be able to receive the wireless second radio signal 502 transmitted by the tag 120, the anchor 110 may enable the following elements during the time period when the tag 120 transmits the second radio signal 502: the TX/RX VCO 212 (more specifically, the RX VCO 212), the RX RF front-end 206, the digital downconverter 208, the I/Q to Mag/Phase converter 210, the TX/RX NCO 218 (more specifically, the RX NCO 218), the control logic 220, and, optionally, the phase compensation unit 214. Furthermore, the switch 204 of the anchor 110 may be in a position configured to enable a signal path so that when the antenna 202 of the anchor 110 receives the second radio signal 502 transmitted by the tag 120, it may provide a signal 224 representing the received second radio signal 502 to the RX RF front-end 206 of the anchor 110 (the relevant switch position of the anchor 110 indicated in FIG. 5 with a dotted box 506). In this manner, the anchor 110 is configured to receive the second wireless radio signal 502 transmitted by the tag 120 in step 312.

Since the radio signal 502 is generated by the tag 120 using a reference clock signal that was adjusted to have its' frequency and phase to match that of the reference clock signal of the anchor 110, as derived from the first radio signal 402 received from the anchor 110, the radio signal 502 may be seen as a pseudo-reflected RF signal, referring to the reflection of the first radio signal 402 being reflected from the tag 120. Thus, the second radio signal 502 received by the anchor 110 will be substantially coherent (in a time-extended/evolution sense) with the first radio signal 402 broadcasted by the anchor 110, allowing determination of the phase difference between the two in step 314 shown in FIG. 3.

In some embodiments, the anchor 110 may perform the following actions once it receives the second radio signal 502: the RX RF front-end 206 of the anchor 110 may downconvert the signal 224 (indicative of the second radio signal 502 received at the antenna 202 of the anchor 110) by mixing the received signal 224 with the RX VCO signal 220 to generate the complex IF signal 226; the digital downconverter 208 of the anchor 110 then further downconverts the complex IF signal 226 by mixing it with the complex phase-compensated NCO signal 234 if the phase compensation unit 214 is used, or with the complex NCO signal 238 if the phase compensation unit 214 is not used, to generate the complex baseband signal 228; the I/Q to Mag/Phase conversion unit 210 of the anchor 110 then converts the I/Q complex baseband signal 228 to generate corresponding magnitude and phase 230 (where the conversion may be performed e.g. as described above), which magnitude and phase 230 is then provided to the control logic 220 of the anchor 110 (or, in general to any suitable data processing system 130) that can then determine phase difference between the first signal 402 as transmitted by the anchor 110 and the second signal 502 as received by the anchor 110.

Thus, in step 314, the control logic 220 of the anchor 110 (or, in general to any suitable data processing system 130) may determine the magnitude of the second radio signal 502, as received at the anchor 110, from the magnitude value of the baseband signal 228 provided as the output 230 from the I/Q to Mag/Phase conversion unit 210, and determine the phase of the second radio signal 502, as received at the anchor 110, from the phase value of the baseband signal 228 provided as the output 230 from the I/Q to Mag/Phase conversion unit 210. Since the phase of the first radio signal 402 transmitted by the anchor 110 is known, the control logic 220 may then compute the phase difference between the first radio signal 402 as transmitted by the anchor 110 and the second radio signal 502 as received by the anchor 110.

Step 314 may be seen as the two-way phase difference measurement part of the two-way ranging protocol described herein. During the two-way phase difference measurement part, the baseband signal 228 at the anchor 110 may be a DC signal since the tag 120 has corrected the relative frequency difference in step 308; the phase of the baseband signal 228 may be substantially equal to twice of the phase shift caused by the propagation channel at the carrier frequency of each frequency step (as set in steps 302 and 318); the magnitude of the baseband signal 228 may be substantially proportional to the magnitude of the second radio signal 502 (i.e. of the propagation channel) at the carrier frequency of each frequency step of the VCOs 212.

As previously described, usually phase difference measurements at different frequencies are performed in order to carry out distance determination based on phase difference. Therefore, the method 300 may then proceed to step 316 where it is determined, e.g. by the control logic 220 of the anchor 110 (or, in general to any suitable data processing system 130) whether more phase difference measurements (and, optionally, first radio signal 402 magnitude measurements, and, further optionally second radio signal 502 magnitude measurements) are needed. If so, then the method 300 proceeds to step 318 where the frequency of the TX/RX VCO 212 of both the anchor 110 and the tag 120 is set to the next value, and the method then proceeds with steps 304-316 as described above but now performed for the next frequency value of the radio signals. This process may be iterated as many times as needed to obtain adequate number of phase difference measurements (and, optionally, first radio signal 402 magnitude measurements, and, further optionally second radio signal 502 magnitude measurements) in order to achieve adequate accuracy for the distance determination. Results of the measurements may be stored in any suitable memory, some examples of which are described with reference to FIG. 7.

Illustrations similar to those shown in FIGS. 4 and 5 may be envisioned if each of the anchor 110 and the tag 120 is implemented as the radio unit 200B, in view of the differences between the systems shown in FIGS. 2A and 2B, as described herein. In the embodiment of the radio unit 200B, analog I/Q mixing unit 250 may be configured to provide substantially the same upconversion on TX signal 248 as in the TX FRONT-END UNIT 216 in the radio unit 200A. In the RX mode, instead of downconverting received signal 224 to IF signal 226 with a further digital downconversion 208 to baseband 228 as was done in the radio unit 200A, the RX FRONT-END UNIT 206 of the radio unit 200B may be configured to downconvert the received signal 224 directly to the baseband signal 228. From the perspective of the control unit 220, the magnitude/phase signal 230 and the control signals 242 and 240 may be identical in the radio units 200A and 200B.

Once it is decided, in step 316, that no more phase difference measurements (and, optionally, first radio signal 402 magnitude measurements, and, further optionally, second radio signal 502 magnitude measurements), the method 300 may proceed to step 320 where the distance d between the anchor 110 and the tag 120 may be determined based the measured phase differences performed for the plurality of VCO frequencies, and, optionally, further based on the first radio signal 402 and/or the second radio signal 502 magnitude measurements performed for the plurality of VCO frequencies. In some embodiments, the distance determination of step 320 may be carried out by the control logic 220 of the anchor 110 or by any suitable data processing unit 130.

In some embodiments, the anchor 110 and the tag 120 may be configured to perform what may be referred to as a "phase-coherent frequency hop" as a part of step 318, which means that each of the anchor 110 and the tag 120 may be configured to substantially synchronously step (or "hop") through a plurality of predefined frequencies (e.g., at predefined frequency steps) to perform a plurality of phase difference measurements to be used in distance determination. In such embodiments, once the tag 120 has performed frequency and phase correction for the first frequency f1, when the tag 120 and the anchor 110 synchronously hop to the next frequency f2 (e.g., doing so at a predefined timing), the VCO phase difference between the tag 120 and the anchor 110 may be maintained. At that point, frequency and phase offset correction does not need to be performed and the phase difference measurements at subsequent frequencies may be performed only based on a signal transmitted from the tag 120 to the anchor 110 or the other way around. Namely, in some embodiments, once the anchor 110 and the tag 120 hopped over to the second frequency f2, the tag 120 may send a third radio signal to the anchor 110, the third radio signal based on tag's reference clock at the second frequency f2. The anchor 110 may then determine the phase difference between its' own reference clock at the second frequency f2 and that of the third radio signal received at the anchor 110 to determine the phase difference for the second frequency f2. The anchor 110 may collect a plurality of such subsequent signals from the tag 120 for different subsequent frequencies, and then perform distance based on phase difference measurements obtained in this manner. In other embodiments, once the anchor 110 and the tag 120 hopped over to the second frequency f2, the anchor 110 may send a third radio signal to the tag 120, the third radio signal based on tag's reference clock at the second frequency f2. The tag 120 may then determine the phase difference between its' own reference clock at the second frequency f2 and that of the third radio signal received at the tag 120 to determine the phase difference for the second frequency f2. The tag 120 may collect a plurality of such subsequent signals from the anchor 110 for different subsequent frequencies, and then perform distance based on phase difference measurements obtained in this manner. In still other embodiments, such subsequent phase measurements at subsequent frequencies may sometimes be initiated by tag 120 (i.e., the tag 120 sends the third radio signal to the anchor 110 at the second frequency f2 or any other subsequent frequency so that the phase difference for this frequency may be performed based on the reference clock of the anchor 110 and on the third radio signal received from the tag 120) and other times be initiated by the anchor 110 (i.e., the anchor 110 sends the third radio signal to the tag 120 at the second frequency f2 or any other subsequent frequency so that the phase difference for this frequency may be performed based on the reference clock of the tag 120 and on the third radio signal received from the anchor 110). In some embodiments, the tag 120 and the anchor 110 may still perform two-way exchange and perform frequency and offset correction for some of the subsequent frequencies, e.g., to make sure that their reference clocks remain synchronized. In various embodiments, the tag 120 and the anchor 110 may be communicatively coupled so that they may exchange data indicative of the phase difference measurements, so that one or the other may perform distance determination in step 320. In other embodiments, the tag 120 and the anchor 110 may provide results of their measurements (or information indicative of the signals received and transmitted) to yet another entity, e.g., to a remote data processing system, which may then perform distance determination of step 320. Thus, in various embodiments, the distance determination of step 320 may be carried out by the control logic 220 of the anchor 110, the control logic 220 of the tag 120, or by any suitable data processing unit 130 which may be implemented in one of, or outside of (i.e., external to) both, the anchor 110 and the tag 120.

Any of the techniques known in the art may be used in step 320 to determine the distance between the anchor 110 and the tag 120, e.g. any of the known inverse Fast Fourier Transform (IFFT) or super-resolution algorithm for range estimation. For example, in the case of using super-resolution algorithms or IFFT-based algorithms, the inputs for distance determination algorithm may be presented as vectors of complex numbers, where the phase of the complex numbers is the phase determined in the two-way phase difference measurements described herein. In various embodiments, the magnitude of the complex numbers can be either the magnitude squared of the first radio signal 402 received at the tag 120, or the magnitude squared of the second radio signal 502 received at the anchor 110, or the product of the magnitudes of the first radio signal 402 received at the tag 120 and the second radio signal 502 received at the anchor 110.

Figure 6:
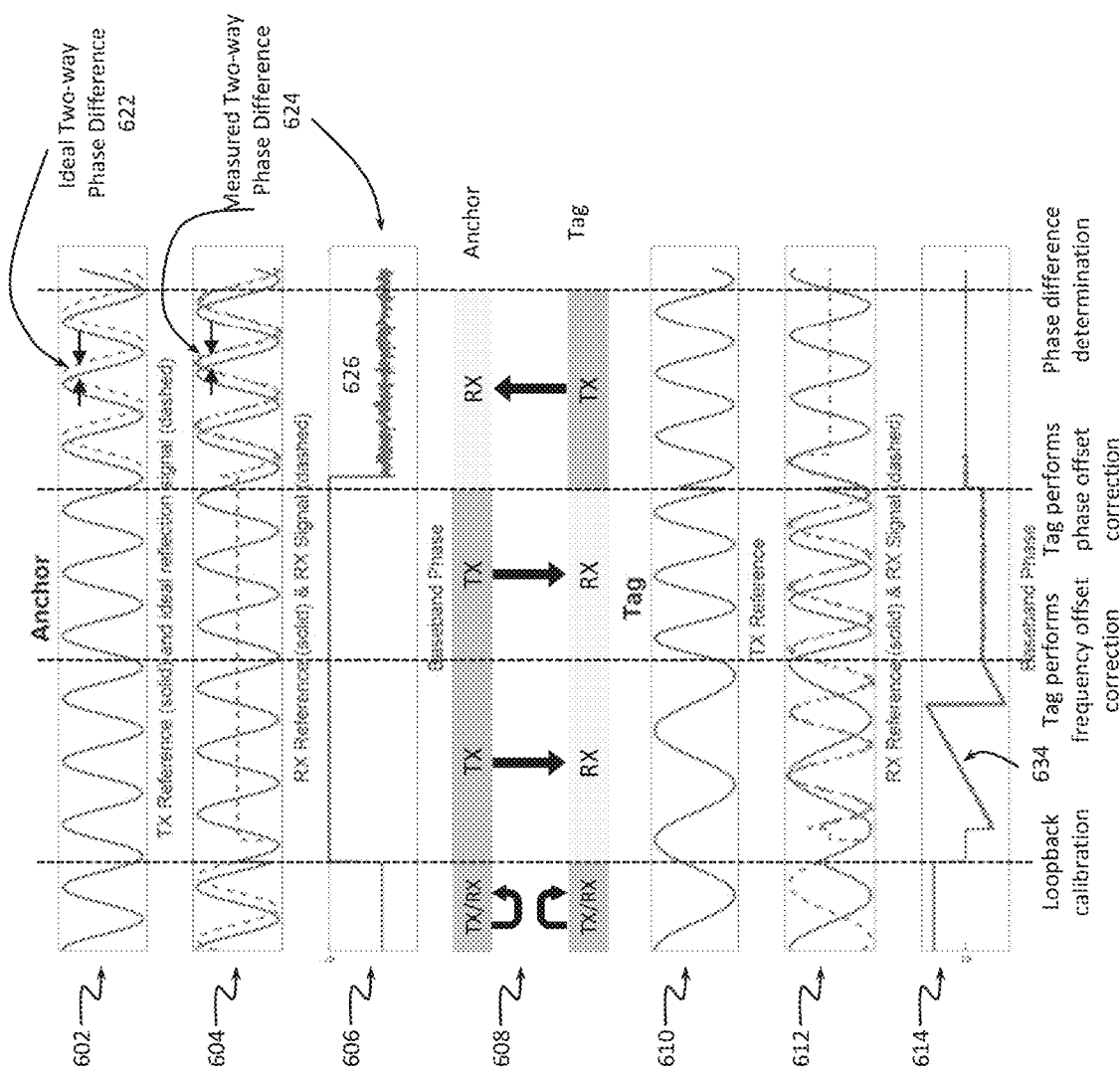
FIG. 6 provides an illustration of various aspects of distance measurement using the method shown in FIG. 3, according to some embodiments of the present disclosure.

Some more details of the method 300 are explained below with reference to FIG. 6, providing an illustration of various aspects of distance measurement using the method shown in FIG. 3, according to some embodiments of the present disclosure. In FIG. 6, timing diagrams 602-614 are illustrated (i.e. the horizontal axis of each of the diagram refers to time), where, for each, different stages of the method 300 are schematically illustrated with vertical dashed lines extending through all of the diagrams. The first vertical dashed line shown in FIG. 6 indicates the end of the part of the method 300 where loopback calibration (step 304) may be performed by each of the anchor 110 and the tag 120. The second vertical dashed line shown in FIG. 6 indicates the end of the part of the method 300 where frequency offset correction at the tag 120 (step 308) is performed. The third vertical dashed line shown in FIG. 6 indicates the end of the part of the method 300 where phase offset correction at the tag 120 (step 310) is performed. Finally, the last vertical dashed line shown in FIG. 6 indicates the end of the part of the method 300 where phase determination (step 314) is performed.

Diagram 602 illustrates a TX reference signal 248 generated by the TX NCO 218 of the anchor 110 (solid line), and an idealized two-way phase difference signal (dashed line) representing an ideal reflection of the first radio signal 402 transmitted by the anchor 110 from the tag 120. As shown in the diagram 602, an idealized reflection would only have a certain phase shift, shown in FIG. 6 as a phase shift 622, which phase shift is then determined in a step similar to the step 314, and based on which distance between the anchor 110 and the tag 120 may be determined. The goal of the frequency and phase compensation of the reference signal of the tag 120 (i.e. steps 308 and 310) is to make the second radio signal 502, actively generated by the tag 120, appear as if it was a passive reflection of the first radio signal 402 transmitted by the anchor, represented by the dashed line of the diagram 602.

Diagram 604 illustrates a RX reference signal 234 (RX NCO after phase compensation) of the anchor 110 (solid line), and the IF signal 226 (dashed line) at the anchor 110 generated based on the radio signal 224 received at the RX RF front-end 206 of the anchor 110, e.g. based on the received second radio signal 502 transmitted by the tag 120. Thus, following tag phase offset correction, diagram 604 illustrates the actual phase difference 624 as determined in step 314 of the method 300.

Diagram 606 illustrates the phase of the baseband signal 230 determined at the anchor 110, where the portion of the baseband phase 626 (i.e. the portion after the third vertical dashed line and leading up to the fourth vertical dashed line, i.e. after tag performed phase offset correction and transmitted the second radio signal 502 as described herein) is indicative of the phase difference 624 between the first radio signal 402 transmitted by the anchor 110 and the second radio signal 502 transmitted by the tag 120, as received at the anchor 110 (i.e. the phase difference determined in step 314).

Diagram 608 illustrates the RF signal direction during different steps of one two-way phase difference measurement at one carrier frequency (i.e. at a given VCO frequency). As indicated in FIG. 6, the upper portion of the diagram 608 illustrates radio signal directions at the anchor 110, while the lower portion of the diagram 608 illustrates radio signal directions at the tag 120.

Diagram 610 illustrates a TX reference clock signal 248 generated by the TX NCO 218 of the tag 120.

Diagram 612 illustrates a RX reference signal 234 (RX NCO after phase compensation) of the tag 120 (solid line), and the IF signal 226 (dashed line) at the tag 120 generated based on the radio signal 224 received at the RX RF front-end 206 of the tag 120, e.g. based on the received first radio signal 402 transmitted by the anchor 110.

Finally, diagram 614 illustrates the phase of the baseband signal 230 determined at the tag 120.

As shown in the diagram 608, the anchor 110 may begin with performing a loopback calibration (step 304, illustrated with the portion of the diagram 608 before the first vertical dashed line), during which TX RF front-end 216 of the anchor 110 transmits the radio signal 236 directly to the RX RF front-end 216 of the anchor 110 (i.e. the radio signal is looped back to the anchor), by configuring the switch 204 with appropriate switch positions. Thus, the signal 224 received at the RX RF front-end 206 is the same as the transmitted signal 236 except for any phase difference due to the propagation of the signal 236 from the TX RF front-end 216 to the RX RF front-end 206. Diagram 608 illustrates that the tag 120 performs analogous loopback calibration on its end.

During such a calibration step, both the anchor 110 and the tag 120 may be configured to reset the phase compensation control words 242, respectively, so that, within each of the anchor 110 and the tag 120, TX reference signal 248 is substantially identical with the RX reference signal 238. As shown in the diagram 604, before the loopback calibration is complete, the received signal at the anchor 110 (i.e., the IF signal 226 (dashed line) at the anchor 110 generated based on the radio signal 224 received at the RX RF front-end 206 of the anchor 110, which, during loopback calibration, is the transmitted signal 236 transmitted by the TX RF front-end 206 of the anchor 110, with a certain internal phase shift) has a phase shift relative to the RX reference signal 234 (solid line) of the anchor 110. Similarly for the tag 120, as shown in the diagram 612, before the loopback calibration is complete, the received signal at the tag 120 (i.e., the IF signal 226 (dashed line) at the tag 120 generated based on the radio signal 224 received at the RX RF front-end 206 of the tag 120, which, during loopback calibration, is the transmitted signal 236 transmitted by the TX RF front-end 206 of the tag 120, with a certain internal phase shift) has a phase shift relative to the RX reference signal 234 (solid line) of the tag 120.

At the end of the loopback calibration, the baseband phase 230 is measured on both the anchor 110 and tag 120, and the control logic 220 sets the phase compensation control words 242 to realize phase compensation of the step 304. As a result, the received signals at both the anchor 110 and tag 120 are in-phase with the RX reference signals, respectively.

After that, the anchor 110 transmits a wireless radio signal, namely the first radio signal 402 described herein, to the tag 120, as shown in the diagram 608 with a thick arrow from the TX of the anchor 110 to the RX of the tag 120 in the portion between the first and second vertical dashed lines, which allows the tag 120 to correct any frequency offset of its' reference clock signal (step 308). In particular, during the frequency correction step, the anchor generates RF signal 236 based on its TX reference signal 248 (solid line in the diagram 602) and transmits it as the wireless radio signal 402; the tag 120 receives the first wireless signal 402 as the RF signal 224, and downconverts it to the IF signal 226 (dashed line in the diagram 612); the frequency difference between the TX/RX reference signals of the tag 120 and the received IF signal 226 (dashed line in the diagram 612) is determined by the control logic 220 based on the phase output 230 (shown in the diagram 614 of the I/Q to Mag/Phase conversion unit 210) at the tag 120. In some embodiments, the frequency difference may be determined by measuring the slope 634 of the baseband phase output 230 shown in the diagram 614. In other embodiments, the frequency difference may be determined by applying a phase-locked-loop (PLL) configured to lock to the IF signal 226 at the tag 120. At the end of the frequency correction step 308, the control logic 220 of the tag 120 applies the frequency control word 240 to both TX and RX reference clock signals 248, 238 (i.e. solid lines shown in the diagrams 610 and 612, respectively). As a result, the frequency of both TX and RX reference clock signals 248, 238 (i.e. solid lines shown in the diagrams 610 and 612, respectively) is the same as that of the IF signal 226 (dashed line in the diagram 612) at the tag 120 generated based on the received first radio signal 402 transmitted by the anchor 110—this can be seen in the diagrams 610 and 612 between the second and the third vertical dashed lines.

As further seen in the diagram 612 between the second and the third vertical dashed lines, the phase of the reference clock signal (solid line) at the tag 120 is still not the same as that of the received signal (dashed line). Therefore, phase correction step 310 takes place between the second and the third vertical dashed lines shown in FIG. 6. During the phase correction step, after the tag frequency correction is applied, the received IF signal (dashed line in the diagram 612) has substantially the same frequency as the RX reference signal (solid line in the diagram 612) but with an unknown phase offset. The control logic 220 at the tag 120 is then configured to measure the relative phase offset between the received IF signal (dashed line in the diagram 612) and the RX reference signal (solid line in the diagram 612) using the phase output 230 (as shown in the diagram 614) of the I/Q to Mag/Phase conversion 210. At the end of the phase correction step, the control logic 220 of the tag 120 may be configured to apply the phase offset word 240 to both TX and RX reference clock signals (solids lines in the diagrams 610 and 612, respectively) of the tag 120, and may store the magnitude of the received signal in memory. After the phase offset word 240 is applied, the RX reference signal (solid line shown in the diagram 612) at the tag 120 matches the received IF signal (dashed line shown in the diagram 612), and the phase output 230 (as shown in the diagram 614) of the I/Q to Mag/Phase conversion 210 reaches zero.

Finally, during two-way phase difference measurement step shown in FIG. 6 between the third and the fourth vertical dashed lines, the tag 120 generates the RF signal 236, based on its frequency- and phase-adjusted TX reference signal (shown in the diagram 610) and transmits it as the second radio signal 502 to the anchor 110. This is shown in the diagram 608 with a thick arrow from the TX of the tag 120 to the RX of the anchor 110 in the portion between the third and fourth vertical dashed lines. The anchor 110 then receives the signal transmitted by the tag 120, as the RF signal 224, and downconverts it to the IF signal 226 (dashed line in the diagram 604). The control logic 220 of the anchor 110 may then compute the baseband phase (as shown in the diagram 606) as the phase difference between the received IF signal (dashed line in the diagram 604) and the RX reference signal (solid line in the diagram 604) based on the output 230 from the I/Q to Mag/Phase conversion unit 210 at the anchor 110. At the end of the two-way phase difference measurement step, the control logic 220 of the anchor 220 may measure the baseband phase based on the phase output 230 of the I/Q to Mag/Phase conversion unit 210, as described above, and may store the measured phase difference, as well as the magnitude of the received signal in memory.

By implementing the protocol as described above, the measured two-way phase difference 624, i.e. the distance indicated between the horizontal arrows in the diagram 604, should match with twice of the phase change due to the propagation channel, i.e. the distance indicated between the horizontal arrows shown in the diagram 602.

Example Data Processing System

FIG. 7 provides a block diagram illustrating an example data processing system 700 that may be configured to implement at least portions of the method shown in FIG. 3, according to some embodiments of the present disclosure. In some embodiments, each of the data processing unit 130, the control logic 220 of the anchor 110, and the control logic 220 of the tag 120 may be implemented as the data processing system 700.

As shown in FIG. 7, the data processing system 700 may include at least one processor 702, e.g. a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure.

In some embodiments, the processor 702 can execute software or an algorithm to perform the activities as discussed in the present disclosure, in particular activities related to distance measurement using two-way phase difference measurements. The processor 702 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from the anchor 110, the tag 120, the data processing unit 130, any of the components of the radio unit 200A, or any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present FIGS., e.g. the radio unit 200A and the processor 702, can also include suitable interfaces for receiving, transmitting, and/or otherwise communicating data or information in a network environment.

In certain example implementations, mechanisms for RF ranging using phase difference as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution. Various measurement data obtained during the two-way RF ranging method described herein may be stored in the memory elements 704.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or LEDs. The output device 714 may be configured to show the result of the distance measurement performed in accordance with the present disclosure. For example, the output device 714 may be configured to provide a graphical user interface and display graphical representation of the distance measured between one or more pairs of anchors and tags. In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

Select Examples

Example 1 provides a radio system that includes a first radio unit (e.g. the anchor/master described herein), a second radio unit (tag/slave described herein), and a data processing unit (e.g. a hardware processor). The first radio unit is configured to transmit a first radio signal (e.g. first RF signal). The second radio unit is configured to receive the first radio signal, adjust a reference clock signal of the second radio unit based on the first radio signal, and transmit a second radio signal (e.g. second RF signal) generated based on the adjusted reference clock signal. The data processing unit is configured to determine a distance between the first radio unit and the second radio unit based on a phase difference between the first radio signal transmitted by the first radio unit and the second radio signal received at the first radio unit.

Example 2 provides the radio system according to example 1, where the second radio unit is configured to adjust the reference clock signal of the second radio unit by the second radio unit setting a frequency of the reference clock signal of the second radio unit based on a frequency of the first radio signal received at the second radio unit, and the second radio unit setting a phase of the reference clock signal of the second radio unit based on a phase of the first radio signal received at the second radio unit.

Example 3 provides the radio system according to example 2, where the second radio unit is configured to set the phase of the reference clock signal of the second radio unit after setting the frequency of the reference clock signal of the second radio unit.

Example 4 provides the radio system according to examples 2 or 3, where the second radio unit is configured to downconvert the first radio signal to generate a first intermediate frequency (IF) signal, and where setting the frequency of the reference clock signal of the second radio unit based on the frequency of the first radio signal received at the second radio unit includes setting the frequency of the reference clock signal of the second radio unit to be substantially equal to a frequency of the first IF signal generated at the second radio unit.

Example 5 provides the radio system according to example 4, where setting the phase of the reference clock signal of the second radio unit based on the phase of the first radio signal received at the second radio unit includes setting the phase of the reference clock signal of the second radio unit to be substantially equal to a phase of the first IF signal generated at the second radio unit.

Example 6 provides the radio system according to any one of the preceding examples, where the second radio unit includes a NCO configured to generate the reference clock signal as a baseband local oscillator signal.

Example 7 provides the radio system according to any one of the preceding examples, where the data processing unit is configured to determine the distance further based on a magnitude of the first radio signal received at the second radio unit or/and a magnitude of the second radio signal received at the first radio unit.

Example 8 provides the radio system according to any one of the preceding examples, where the data processing unit is configured to determine the phase difference and, optionally, the magnitude of the first radio signal received at the second radio unit or/and the magnitude of the second radio signal received at the first radio unit, for each of a plurality of measurements, where, in different measurements, the first radio signal has different frequencies.

Example 9 provides the radio system according to example 8, where the data processing unit is configured to determine the distance based on the phase difference and, optionally, the magnitude of the first radio signal received at the second radio unit or/and the magnitude of the second radio signal received at the first radio unit, determined for the plurality of measurements.

Example 10 provides the radio system according to example 1, where the first radio signal has a first frequency, and the first radio unit is further configured to transmit a third radio signal that has a second frequency, different from the first frequency. In this example, the second radio unit is further configured to receive the third signal, adjust the reference clock signal of the second radio unit based on the third signal, transmit a fourth radio signal generated based on the adjusted reference clock signal, while the data processing unit is configured to determine the distance between the first radio unit and the second radio unit further based on a phase difference between the third signal transmitted by the first radio unit and the fourth signal received at the first radio unit and, optionally, the magnitude of the third radio signal received at the second radio unit or/and the magnitude of the fourth radio signal received at the first radio unit.

Example 11 provides the radio system according to any one of the preceding examples, where the data processing unit is included in the first radio unit.

Example 12 provides the radio system according to any one of the preceding examples, where at least one of, but preferably each of, the first radio unit and the second radio unit is configured to perform a calibration, e.g. a loopback calibration, to account for a phase shift within the radio unit.

Example 13 provides the radio system according to any one of the preceding examples, where the first radio unit and the second radio unit are further configured for wireless data communication.

Example 14 provides a radio unit that includes means (e.g. an antenna) for receiving a first radio signal (e.g. first RF signal) transmitted by a further radio unit; means (e.g. a NCO) for generating a reference clock signal based on which the radio unit is configured to transmit radio signals; means (e.g. a control logic, e.g. implemented as a hardware processor) for adjusting the reference clock signal based on the first radio signal; and means (e.g. an antenna) for transmitting a second radio signal (e.g. second RF signal) generated based on the adjusted reference clock signal, where the second radio signal is configured to enable determination of a distance between the radio unit and the further radio unit based on a phase difference between the first radio signal transmitted by the further radio unit and the second radio signal transmitted by the radio unit as received at the further radio unit and, optionally, further based on the magnitude of the first radio signal received at the radio unit or/and the magnitude of the second radio signal received at the further radio unit.

Example 15 provides the radio unit according to example 14, where adjusting the reference clock signal of the radio unit includes adjusting a frequency of the reference clock signal based on a frequency of the first radio signal received at the radio unit, and adjusting a phase of the reference clock signal based on a phase of the first radio signal received at the radio unit.

Example 16 provides the radio unit according to example 15, where the phase of the reference clock signal is adjusted after adjusting the frequency of the reference clock signal.

Example 17 provides the radio unit according to examples 15 or 16, further including means (e.g. RX RF front-end) for downconverting the first radio signal to generate a first intermediate frequency (IF) signal, where adjusting the frequency of the reference clock signal of the radio unit based on the frequency of the first radio signal includes adjusting the frequency of the reference clock signal to be substantially equal to a frequency of the first IF signal, and where adjusting the phase of the reference clock signal of the radio unit based on the phase of the first radio signal includes adjusting the phase of the reference clock signal to be substantially equal to a phase of the first IF signal.

Example 18 provides the radio unit according to any one of examples 14-17, where said first radio signal is one of a plurality of first radio signals, each of the first radio signals having a different frequency, the means for adjusting the reference clock signal based on the first radio signal is configured to adjust the reference clock signal based on the first radio signal for each of the plurality of first radio signals, and the means for transmitting the second radio signal is configured to transmit the second radio signal generated based on the adjusted reference clock signal for each of the plurality of first radio signals.

Example 19 provides the radio unit according to example 18, where the plurality of first radio signals include radio signals at frequency steps of between about 10 kilohertz and 10 megahertz.

Example 20 provides a non-transitory computer-readable storage medium including instructions for execution which, when executed by a hardware processor, are operable to perform operations including adjusting a reference clock signal of a radio unit based on a first radio signal (e.g. first RF signal) received at the radio unit and transmitted by a further radio unit, where the adjusting includes adjusting a frequency of the reference clock signal based on a frequency of the first radio signal received at the radio unit and adjusting a phase of the reference clock signal based on a phase of the first radio signal received at the radio unit; and generating a second radio signal (e.g. second RF signal) for transmission to the further radio unit, where the second radio signal is generated based on the adjusted reference clock signal and where the second radio signal is configured to enable determination of a distance between the radio unit and the further radio unit based on a phase difference between the first radio signal transmitted by the further radio unit and the second radio signal transmitted by the radio unit as received at the further radio unit and, optionally, further based on the magnitude of the first radio signal received at the radio unit or/and the magnitude of the second radio signal received at the further radio unit.

In further examples, the non-transitory computer-readable storage medium according to example 20 may further include instructions operable to perform operations performed by the second radio unit in accordance with any one of examples 1-13, or/and operations performed by the radio unit in accordance with any one of Examples 14-19.

Variations and Implementations

While embodiments of the present disclosure were described above with references to exemplary implementations as shown in FIGS. 1-7, a person skilled in the art will realize that the various teachings described above are applicable to a large variety of other implementations. In particular, while some descriptions provided in the present disclosure refer to oscillation sources within the TX/RX VCO 212 as separate oscillation sources (i.e. as RX VCO providing the signal 222 and TX VCO providing the signal 232), these descriptions are applicable to a single source of oscillation to provide both local oscillator signals, 222 and 232. Similarly, while some descriptions provided in the present disclosure refer to oscillation sources within the TX/RX reference clock 218 as separate oscillation sources (i.e. as RX NCO providing the signal 238 and TX NCO providing the signal 248), these descriptions are applicable to a single source of oscillation to provide both reference clock signals, 238 and 248. Further, while some descriptions provided in the present disclosure refer to using the same receive path for loopback calibration and frequency/phase difference measurements, these descriptions are applicable to radio units 200A with a separate receive path for loopback calibration.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g. clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to virtual dithering.

Parts of various systems for implementing the RF ranging using phase difference as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present FIGS. may be implemented as stand-alone modules (e.g., a device with associated components and circuitry configured to perform a specific application or function) or implemented as plug-in modules into application specific hardware of electronic devices. Note that particular embodiments of the present disclosure implementing the RF ranging using phase difference may be readily included in a system on chip (SOC) package, either in part, or in whole. An SOC represents an integrated circuit (IC) that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package. In various other embodiments, the RF ranging using phase difference proposed herein may be implemented in one or more silicon cores in ASICs, FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the present FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the RF ranging using phase difference as proposed herein illustrate only some of the possible functions that may be executed by, or within, system illustrated in the present FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The invention claimed is:

1. A radio system, comprising:
a first radio unit to transmit a first radio signal, wherein the first radio signal is generated based on a current reference clock signal of the first radio unit;
a second radio unit to receive the first radio signal, adjust a reference clock signal of the second radio unit based on the first radio signal to set a new current reference clock signal of the second radio unit, and transmit a second radio signal generated based on a new current reference clock signal; and
a data processing unit to determine a distance between the first radio unit and the second radio unit based on a phase difference between the first radio signal and the second radio signal received at the first radio unit,
wherein, following the second radio unit transmitting the second radio signal generated based on the new current reference clock signal, each of the first radio unit and the second radio unit is to perform a plurality of phase-coherent frequency hop iterations, wherein each iteration includes:
the first radio unit changing, by a predefined frequency difference, a reference clock signal that is the current reference clock signal of the first radio unit at a beginning of the iteration to set a new current reference clock signal of the first radio unit for the iteration,
the first radio unit transmitting an updated first radio signal, wherein the updated first radio signal is generated by the first radio unit based on the new current reference clock signal of the first radio unit for the iteration,
the second radio unit changing, by the predefined frequency difference, a reference clock signal that is the current reference clock signal of the second radio unit at a beginning of the iteration to set an intermediate new current reference clock signal of the second radio unit for the iteration, and further adjusting the intermediate new current reference clock signal of the second radio unit for the iteration based on the updated first radio signal received by the second radio unit to set a new current reference clock signal of the second radio unit for the iteration,
the second radio unit transmitting an updated second radio signal, wherein the updated second radio signal is generated by the second radio unit based on the new current reference clock signal of the second radio unit for the iteration, and
the data processing unit computing a phase difference between the updated first radio signal and the updated second radio signal received at the first radio unit in the iteration,
wherein the data processing unit is configured to determine the distance between the first radio unit and the second radio unit further based on the phase difference between the updated first radio signal and the updated second radio signal received at the first radio unit computed for each iteration of the plurality of phase-coherent frequency hop iterations.

2. The radio system according to claim 1, wherein the second radio unit is configured to adjust the reference clock signal of the second radio unit by:
the second radio unit setting a frequency of the reference clock signal of the second radio unit based on a frequency of the first radio signal received at the second radio unit, and
the second radio unit setting a phase of the reference clock signal of the second radio unit based on a phase of the first radio signal received at the second radio unit.

3. The radio system according to claim 2, wherein the second radio unit is configured to set the phase of the reference clock signal of the second radio unit after setting the frequency of the reference clock signal of the second radio unit.

4. The radio system according to claim 2, wherein the second radio unit is configured to downconvert the first radio signal to generate a first intermediate frequency (IF) signal, and wherein setting the frequency of the reference clock signal of the second radio unit based on the frequency of the first radio signal includes setting the frequency of the reference clock signal of the second radio unit to be substantially equal to a frequency of the first IF signal.

5. The radio system according to claim 4, wherein setting the phase of the reference clock signal of the second radio unit based on the phase of the first radio signal includes setting the phase of the reference clock signal of the second radio unit to be substantially equal to a phase of the first IF signal.

6. The radio system according to claim 1, wherein the second radio unit includes a numerically controlled oscillator configured to generate the reference clock signal as a baseband local oscillator signal.

7. The radio system according to claim 1, wherein the data processing unit is configured to determine the distance further based on a magnitude of the first radio signal received at the second radio unit or/and a magnitude of the second radio signal received at the first radio unit.

8. The radio system according to claim 1, wherein the data processing unit is configured to determine the phase difference for each of a plurality of measurements, where, in different measurements, the first radio signal has different frequencies.

9. The radio system according to claim 1, wherein:
the first radio signal has a first frequency,
the first radio unit is further configured to transmit a third radio signal that has a second frequency,
the second radio unit is further configured to receive the third radio signal, adjust the reference clock signal of the second radio unit based on the third signal, and transmit a fourth radio signal generated based on the adjusted reference clock signal of the second radio unit, and
the data processing unit is configured to determine the distance between the first radio unit and the second radio unit further based on a phase difference between the third signal transmitted by the first radio unit and the fourth signal received at the first radio unit.

10. The radio system according to claim 1, wherein the data processing unit is a part of the first radio unit.

11. The radio system according to claim 1, wherein each of the first radio unit and the second radio unit is one of a wireless sensor, a handset, a smart home system device, or a mobile device.

12. A radio unit, comprising:
a circuit for receiving a first radio signal transmitted by a further radio unit, wherein the first radio signal is based on a current reference clock signal of the further radio unit;
a circuit for generating a reference clock signal based on which the radio unit is configured to transmit radio signals;
a circuit for adjusting the reference clock signal based on the first radio signal to set a new current reference clock signal of the radio unit; and
a circuit for transmitting a second radio signal generated based on a new current reference clock signal,
wherein the second radio signal enables determination of a distance between the radio unit and the further radio unit based on a phase difference between the first radio signal transmitted by the further radio unit and the second radio signal transmitted by the radio unit as received at the further radio unit, and
wherein, after transmission of the second radio signal, the radio unit is to perform a plurality of phase-coherent frequency hop iterations, wherein each iteration includes:
the radio unit changing, by a predefined frequency difference, a reference clock signal that is the current reference clock signal of the radio unit at a beginning of the iteration to set an intermediate new current reference clock signal of the radio unit for the iteration, and further adjusting the intermediate new current reference clock signal of the radio unit for the iteration based on an updated first radio signal transmitted by the further radio unit and received by the radio unit to set a new current reference clock signal of the radio unit for the iteration,
the radio unit transmitting an updated second radio signal, wherein the updated second radio signal is generated by the radio unit based on the new current reference clock signal of the radio unit for the iteration, and
the data processing unit computing a phase difference between the updated first radio signal and the updated second radio signal received at the further radio unit in the iteration,
wherein the data processing unit is configured to determine the distance between the further radio unit and the radio unit further based on the phase difference between the updated first radio signal and the updated second radio signal received at the further radio unit computed for each iteration of the plurality of phase-coherent frequency hop iterations.

13. The radio unit according to claim 12, wherein adjusting the reference clock signal of the radio unit includes:
adjusting a frequency of the reference clock signal based on a frequency of the first radio signal received at the radio unit, and
adjusting a phase of the reference clock signal based on a phase of the first radio signal received at the radio unit.

14. The radio unit according to claim 13, wherein the phase of the reference clock signal is adjusted after adjusting the frequency of the reference clock signal.

15. The radio unit according to claim 13, further comprising:
a circuit for downconverting the first radio signal to generate a first intermediate frequency (IF) signal,
wherein adjusting the frequency of the reference clock signal of the radio unit based on the frequency of the first radio signal includes adjusting the frequency of the reference clock signal to be substantially equal to a frequency of the first IF signal, and
wherein adjusting the phase of the reference clock signal of the radio unit based on the phase of the first radio signal includes adjusting the phase of the reference clock signal to be substantially equal to a phase of the first IF signal.

16. The radio unit according to claim 12, wherein:
said first radio signal is one of a plurality of first radio signals, each of the first radio signals having a different frequency,
the circuit for adjusting the reference clock signal based on the first radio signal is configured to adjust the reference clock signal based on the first radio signal for each of the plurality of first radio signals, and
the circuit for transmitting the second radio signal is configured to transmit the second radio signal generated based on the adjusted reference clock signal for each of the plurality of first radio signals.

17. The radio unit according to claim 16, wherein the plurality of first radio signals include radio signals at frequency steps of between 10 kilohertz and 10 megahertz.

18. A radio unit, comprising:
a circuit for transmitting a first radio signal, wherein the first radio signal is based on a current reference clock signal of the radio unit; and
a circuit for receiving a second radio signal transmitted by a further radio unit, wherein the second radio signal is based on a new current reference clock signal of the further radio unit, and wherein the new current reference clock signal of the further radio unit is based on adjusting a reference clock signal of the further radio unit based on the further radio unit receiving the first radio signal,
wherein the first radio signal and the second radio signal enable determination of a distance between the radio unit and the further radio unit based on a phase difference between the first radio signal transmitted by the radio unit and the second radio signal transmitted by the further radio unit as received at the radio unit, and
wherein, after the receipt of the second radio signal, the radio unit is to perform a plurality of phase-coherent frequency hop iterations, wherein each iteration includes:
the radio unit changing, by a predefined frequency difference, a reference clock signal that is the current reference clock signal of the radio unit at a beginning of the iteration to set a new current reference clock signal of the radio unit for the iteration,
the radio unit transmitting an updated first radio signal, wherein the updated first radio signal is generated by the radio unit based on the new current reference clock signal of the radio unit for the iteration, and
the data processing unit computing a phase difference between the updated first radio signal and an updated second radio signal received at the radio unit in the iteration, wherein the updated second radio signal is transmitted by the further radio unit and is based on a new current reference clock signal of the further radio unit for the iteration, wherein the data processing unit is configured to determine the distance between the radio unit and the further radio unit further based on the phase difference between the updated first radio signal and the updated second radio signal received at the radio unit computed for each iteration of the plurality of phase-coherent frequency hop iterations.

* * * * *